Patented Oct. 26, 1954

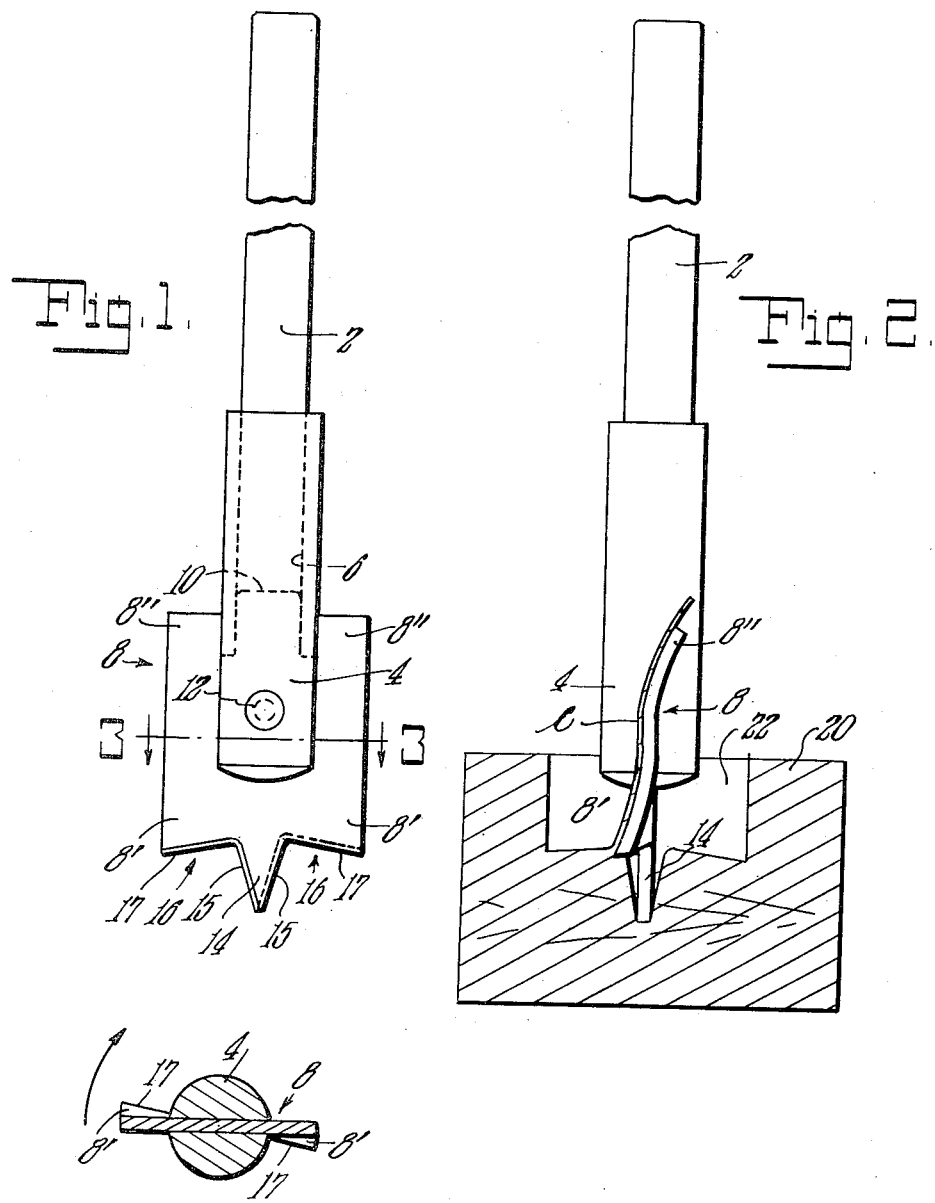

2,692,627

UNITED STATES PATENT OFFICE 2,692,627

BORING TOOL

Walter I. Stearns, Arlington, Vt., assignor to Edw. L. Sibley Mfg. Co., Inc., Bennington, Vt., a corporation of Vermont Application October 19, 1953, Serial No. 386,695

1 Claim. (Cl. 145—116)

This invention relates to new and useful improvements in tools and is directed more particularly to the provision of improvements in a boring tool or bit.

The principal object of the invention is the provision of a novel and improved boring tool or bit adapted for boring holes in wood or the like at high rates of speed and is so constructed as to provide a clean smooth hole in the article being worked upon.

According to novel features of the invention, the tool includes an elongated blade formed from suitable steel of relatively greater transverse width than thickness so as to have a sharpened tapering pilot point at its lower end with transverse cutting edges extending outwardly from the upper portion of the point to longitudinal side edges of the blade. Opposite longitudinal portions of the blade are shaped in the form of a reverse curve so as to provide lower cutting edges extending forwardly in the direction of rotation of the tool and trailing edges extending rearwardly relative to the said direction of rotation. The lower cutting edges of the blade extend outwardly and downwardly from the pilot point.

The novel features of construction provide a tool which is adapted for rotation at high rates of speed for fast cutting and deep boring without clogging or plugging and the particular form of the side portions of the blade make for efficient elimination of long clean chips from the hole being bored.

A holder or shank is provided for the blade which has a transverse slot so as to receive the upper end of the blade and the said upper end is provided with a tang fitting in a bore of the shank, the said blade and shank being secured together by screw means or the like.

With the above primary objects in view, it is another object of my invention to provide a construction of the above described character in which the number of operating parts is greatly reduced and which is compact in accordance with the demands and desires of manufacturers and purchasers alike and which is not only distinctive in its appearance and practical in its value but also reliable in its operation and efficient in its use.

It is still a further object to provide a device which is constructed of relatively simple parts which are adapted to be readily assembled and which when once assembled are positively and securely retained in operative relationship.

It is a further object of the invention to provide a bit which permits fast, deep boring without clogging or burning and, by the spin grinding of the blade, a smooth hole results therefrom.

All of the above cited objects I accomplish by means of such structure and relative arrangement of parts thereof, as will fully appear by a perusal of the description below and by various specific features which will be hereinafter set forth. To these above and other ends and with the foregoing and various other and ancillary features and advantages and objects of my invention as will become more readily apparent as the description proceeds, my invention consists in certain novel features of construction in a mode of operation and in the combination organization and arrangement of parts as will be hereinafter more particularly pointed out in the claim hereunto annexed and more fully described and referred to in conjunction with the accompanying drawings wherein:

Fig. 1 is a side elevational view of a tool embodying the novel features of the invention;

Fig. 2 is a similar view of the tool with the blade of the tool shown edgewise and the tool in a hole formed thereby; and Fig. 3 is a sectional view on the line 3—3 of Fig. 1.

In the above mentioned drawing annexed hereto and forming a part of this specification, I have shown but one embodiment of my invention which is deemed preferable, but it is to be understood that changes and modifications may be made in various respects and within the scope of the appended claims without departing from the broad aspects and spirit of the invention.

Briefly and in its broadest aspect, my invention features the basic principle of a blade having a compound curve where the leading edge acts as a chisel and cuts the wood. The curve above the leading edge rolls the chips up. The smooth transfer into a reverse curve at the top of the blade acts as an ejector throwing the chips up so that they will not load around the tool causing burning, plugging and clogging.

Prior art blades each have the objectionable features of a straight leading angle from the cutting edge and a straight back section.

In the following description and claims, various details will be identified by specific names for convenience. These names, however, are intended to be as generic in their application as the art will permit.

Referring now to the drawing more in detail, in which similar characters of reference indicate corresponding parts in the several figures and referring more particularly to the preferred form of my invention selected for illustrative purposes, I have shown a shank or holder which is represented by 2 and which may be of any desired length for gripping in a chuck or the like.

The lower end 4 of the shank 2 is provided with an upwardly extending slot and with an axial bore 6 extending upwardly from the slot. The lower portion 4 will be integral with the upper portion of the shank.

A blade 8 is provided with a tang 10 on its upper end which is receivable in the bore 6 with the upper portion of said blade in the slot of the shank provided therefor. A screw 12 extends through the shank and blade for securing them together.

There may be blades of different diameters and lengths which may be associated with the shank.

The blade 8 is formed from a strip of suitable steel of relatively less thickness than transverse width and the cutting edges thereof shortly to be referred to will be provided by well known grinding operations or the like.

A pilot point 14 which is tapering and has relatively diverging opposite sides extends downwardly at the lower side of the blade.

The blade is arranged for clockwise rotation and the forward or leading edges of the pilot are sharpened at 15.

Lower side portions 16 of the blade extend outwardly and downwardly from the pilot to the outer longitudinal side edges of the blade as shown. The forward or leading edges of the portions 16 are sharpened at 17.

Longitudinal side portions of the blade are formed in the shape of an S or reverse curve (see Fig. 2). This formation results in lower portions 8' and edges of the blade at its opposite transverse sides extending forwardly relative to the direction of rotation of the blade. Upper portions 8" of the blade side portions extend rearwardly away from the direction of rotation of the blade.

A block of wood 20 is shown in section in Fig. 2. The blade is shown in connection therewith as would appear in boring or drilling a hole 22 in said block.

In the rotation of the blade, the pilot serves to hold the blade on the true axis of rotation and the lower cutting edges 17 function to form the hole.

Rapid cutting without burning is accomplished by the arrangement of the cutting edges. Chip elimination is accomplished by the reverse curve of the longitudinal sides of the blade. The chip is represented by c and, as shown, it follows up the forward side of the blade and off the upper end thereof.

Chip elimination is necessary in order to prevent clogging and provide a clean hole and the novel construction is such as to function as guiding means for the chip.

Opposite sides of the blade are preferably such at least as to provide a blade of uniform width or diameter or, in some cases, the blade may have a very slightly less transverse width at its upper than its lower end. A blade having a lower end of greater width than its upper end is undesirable.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A tool for boring holes in wood or the like adapted for rotation in a certain direction comprising, an elongated blade of flat metal having longitudinal side edges and an elongated holder having an end portion secured to an upper portion of said blade inwardly of the longitudinal side edges thereof providing longitudinal side portions of said blade at opposite sides of the said holder, the lower edge of said blade provided with a flat pilot depending therefrom having longitudinal relatively converging straight side edges terminating in a point on an extended longitudinal axis of said holder and the lower edge of said blade having portions at opposite sides of the pilot declining downwardly and outwardly from upper side edges of the pilot to the longitudinal side edges of said blade, said lower edge portions of said blade and side edges of the pilot being sharpened for cutting in rotation of said blade in said certain direction, lower edge portions and upper edge portions of said blade being offset forwardly and rearwardly respectively relative to the direction of rotation of said blade and to a plane extending through and parallel with the longitudinal axis of said holder whereby the lower cutting edges of said blade are disposed radially of said axis and the opposite longitudinal side portions of said blade from said lower cutting edges upwardly to upper edges of said blade are in the form of a reverse curve for guiding chips upwardly and rearwardly.

References Cited in the file of this patent

UNITED STATES PATENTS

| Number | Name | Date |
| --- | --- | --- |
| 124,089 | Shepardeson | Feb. 27, 1872 |
| 238,002 | Ransom | Feb. 22, 1881 |
| 2,543,206 | Smith | Feb. 27, 1951 |
| 2,627,292 | Kronwall | Feb. 3, 1953 |
| 2,655,964 | Labbee | Oct. 20, 1953 |

FOREIGN PATENTS

| Number | Country | Date |
| --- | --- | --- |
| 17,756 | Great Britain | of 1911 |